(12) United States Patent
Buchalla et al.

(10) Patent No.: US 6,290,378 B1
(45) Date of Patent: Sep. 18, 2001

(54) LIGHTING DEVICE FOR A MOTOR VEHICLE

(75) Inventors: Harald Buchalla, Amorbach; Peter Furst, Bürgstadt; Herwig Polzer, Miltenberg, all of (DE)

(73) Assignee: Donnelly Hohe GmbH & Co. KG (DE)

(*) Notice: Subject to any disclaimer, the term of this patent is extended or adjusted under 35 U.S.C. 154(b) by 0 days.

(21) Appl. No.: 09/360,240

(22) Filed: Jul. 23, 1999

(30) Foreign Application Priority Data

Jul. 24, 1998 (DE) ............................. 198 33 299

(51) Int. Cl.⁷ ............................. F21V 13/14; B60Q 1/24
(52) U.S. Cl. ............................. 362/494; 362/140; 362/268; 362/293; 362/510; 362/309; 362/331
(58) Field of Search .................... 362/135, 268, 362/331, 494, 293, 510, 140, 309

(56) References Cited

U.S. PATENT DOCUMENTS

| | | | |
|---|---|---|---|
| 4,646,210 | * 2/1987 | Skogler et al. | 362/494 |
| 4,781,436 | 11/1988 | Armbruster | 359/606 |
| 5,178,448 | * 1/1993 | Adams et al. | 362/494 |
| 5,402,103 | * 3/1995 | Tashiro | 362/494 |

FOREIGN PATENT DOCUMENTS

| | | |
|---|---|---|
| 36 35 471 A1 | 4/1988 | (DE) . |
| 36 35 473 A1 | 4/1988 | (DE) . |
| 3911140 | 10/1990 | (DE) . |
| 0165817 | 12/1985 | (EP) . |
| 0496921 | 8/1992 | (EP) . |
| 0820901 | 1/1998 | (EP) . |

\* cited by examiner

*Primary Examiner*—Alan Cariaso
(74) *Attorney, Agent, or Firm*—McGlew and Tuttle, P.C.

(57) ABSTRACT

A lighting device (26) for arrangement on the external or internal rear view mirror of a motor vehicle is provided with a light source (27), the light rays of which emerge at a mirror housing opening and are deflected at a transparent light refraction element (33) arranged in the beam path. The plate-like light refraction element (33) has, at least on one side, a surface structure (36) by means of which the light refraction element is divided into several light refraction zones. To achieve a deflection of the light into a preferred direction the light refraction element (33) is designed in the manner of a Fresnel prism (33), the light refraction zones corresponding to prism zones of a prism body which are pushed together in stepwise manner. To intensify the deflection of the light beam into the preferred direction a decentralized condenser lens (31) may be arranged in front of the Fresnel prism (33).

21 Claims, 9 Drawing Sheets

LIGHTING DEVICE FOR A MOTOR VEHICLE

FIELD OF THE INVENTION

The invention relates to a lighting device for arrangement on the external or internal rear view mirror of a motor vehicle with a light source, the light rays of which emerge at a mirror housing opening and are deflected at a transparent light refraction element arranged in the beam path, the plate-like light refraction element having a surface structure, at least on one side, by means of which the light refraction element is divided into several light refraction zones.

BACKGROUND OF THE INVENTION

Lighting devices of this kind are incorporated into the external or internal rear view mirrors of motor vehicles and serve either to illuminate the interior or to illuminate the road surface in the entry region in front of the vehicle's doors. The light generated by the light source emerges at a mirror housing opening and radiates therefrom in beam form. The generated luminous intensity in the various regions of the field of illumination thus substantially depends on the distance between the region in question and the lighting device and on the angle of the incident light.

Since the installation location of the lighting device is predetermined by the positioning of the external or internal rear view mirror, in many cases the luminous intensity is distributed in the field of illumination in a manner which is not optimal. Far distant places in particular are only relatively poorly lit, for which reason a high illumination power is required. It is therefore known to arrange optical components in the path of the beam of the lighting device by means of which the distribution of the luminous intensity may be influenced. Fresnel lenses in particular have been proposed for this application because they are inexpensive to produce and are of compact size. Fresnel lenses are plate-like light refraction elements, of glass or plastic for example, which at least on one side have a surface structure by means of which the Fresnel lens is divided up into several light refraction zones. The light refraction zones correspond to circular ring-shaped lens sections which are pushed together stepwise in the plate plane so that the light refraction in a Fresnel lens approximately corresponds to the light refraction in a three-dimensional lens body.

It is a drawback to the use of the known centric Fresnel lenses that the light beam can only be scattered or collected depending on design, by the refraction at the Fresnel lens. This means that the light beam generated can be either widened or concentrated by the Fresnel lens.

A deflection of the light beam into a certain preferred direction cannot be achieved by the centric Fresnel lens as the light refraction zones are arranged circular-symmetrical to the optical center line.

SUMMARY AND OBJECTS OF THE INVENTION

The primary object of the present invention is to provide a generic lighting device, the light beam of which may be deflected into a preferred direction by light refraction in a light refraction element.

According to the invention a lighting device is provided for arrangement on the external or internal rear view mirror of a motor vehicle with a light source, the light rays of which emerge at a mirror housing opening and are deflected at a transparent light refraction element arranged in the beam path. The plate-like light refraction element has a surface structure, at least on one side, by means of which the light refraction element is divided into several light refraction zones a light refraction element which is designed in the manner of a Fresnel prism is arranged in the beam path of the lighting device. The light refraction element has a surface structure which divides it into a plurality of at least two light refraction zones, the light refraction zones preferably Corresponding to the prism zones of a three-dimensional prism body which are pushed together in stepwise manner.

It is known that a light beam is refracted in a prism body and deflected by a certain angular quantity. As a prism body requires a great deal of installation space and can only be produced at high cost, the prism zones of the prism body are pushed together in stepwise manner, so that a Fresnel prism with a plate-like structure according to the invention emerges. The optical effect of the Fresnel prism substantially corresponds to the effect of a prism body with spatial expansion, so that the Fresnel prism also brings about an angular deflection of an incident light beam. In the solution the light beam may be deflected into a preferred direction by the Fresnel prism by light refraction. The design and relative arrangement of the individual prism zones is arbitrary according to the invention and must be matched to the particular application. According to the invention a Fresnel prism is also conceivable which represents a combination of a centric Fresnel lens and a Fresnel prism, so as to be able to bundle or scatter the light beam at the same time as the deflection.

According to a preferred embodiment of the invention the prism zones are arranged in the Fresnel prism in a manner running linearly parallel to each other. Such Fresnel prisms may be produced inexpensively since the necessary plate contour may be cut or stamped out of a continuous material or may be produced by injection molding. Fresnel prisms with prism zones which run in arbitrarily curved manner are, of course, also conceivable.

If the lighting device is installed in an external rear view mirror, it is advantageous when the prism zones run substantially perpendicular to the longitudinal axis of the vehicle. In this case the individual prism zones should be formed in such a way that the light is refracted in the direction of the rear of the vehicle. By this arrangement it is possible to illuminate the entry region in front of the vehicle doors substantially completely without regions of the road surfaces which lie outside the entry region being illuminated unnecessarily. The light energy used is therefore optimally distributed over the desired field of illumination.

The light beam emerging at the underside of the external rear view mirror is deflected by the Fresnel prism in such a way, for example, that the front edge of the light cone impinges on the road surface in the region of the front edge of the door and the rear edge of the emerging light cone at the rear end of the entry region, in front of the rear wheel for example. In the solution the light cone is concentrated on the entry region by light refraction. If the light beam were not deflected it would propagate uniformly from the light source so that a large region in front of the entry region would be illuminated unnecessarily.

The prism zones of a regular Fresnel prism all have the same angle of refraction so that parallel incident light in all prism zones is deflected by the same angular quantity. According to the invention, Fresnel prisms may also be employed which have at least two prism zones with different angles of refraction. The achievement of this is that the light is deflected at the different prism zones at different angles so that according to the choice of the different angles of refraction the light beam may be collected or scattered in different spatial sectors.

If the lighting device is used in an external rear view mirror to illuminate the entry region, a light emergence surface virtually parallel to the road surface is produced because of the installation situation of the lighting device in the base region of the external mirror. The external mirror comprises an exterior mirror assembly including a housing within which is located a reflective element, which may be electrochromic or conventional (such as a chromium or titanium metal reflector coating on a glass substrate) and with the reflector preferably positionable by a manual or electrically actuated actuator, the actuator also located within the mirror assembly housing. The exterior mirror assembly further comprises a mount that attaches the housing to the side of the vehicle.

The mount may be a breakaway mount or a powerfold mount, as known in the rearview mirror art, and may comprise a mounting bracket and/or a sail. The lighting device of this present invention may be positioned in the housing of the mirror assembly or may be positioned in the mirror assembly mount so that, for example, the light beam generated by the lighting device projects downwardly and rearwardly from either the housing of the assembly or from the bracket of the assembly to illuminate a security zone on the ground adjacent the doors of the vehicle. The vertical luminous intensity resulting on the road decreases, inter alia, in proportion to the square of the distance away from the light source and also with the cosine of the angle of incidence. As the external rear view mirror is arranged on the side of the vehicle door which faces the front of the vehicle, in order to achieve an extensively uniform luminous intensity distribution on the road surface in the entry region, which may extend to the rear wheel, a large part of the light energy of the light beam must be reflected in concentrated manner in the direction of the rear of the vehicle.

It is therefore advantageous when the angle of refraction of the individual prism zones is selected in such a way that the angle between two light beams emerging at adjacent prism zones decreases as the distance from the front prism zone increases. The front prism zone denotes the prism zone which is nearest to the front of the vehicle. The desired concentration of the light energy towards the rear of the vehicle is made possible by this location-dependent refractive angle distribution, as the concentration of the light beams increases in the direction of the rear of the vehicle. The refractive angle distribution of the individual prism zones which is necessary for a certain embodiment depends on a multiplicity of influential factors such as the reflector geometry and the light source. In complex lighting devices, the correct angle of refraction for each prism zone must be determined separately, and this may advantageously take place by means of computer-aided simulations.

To rule out damage to the sensitive prism structure which is engraved into one side of the plate, the prism structure should preferably be arranged in the lighting device pointing towards the interior of the mirror housing. The external side of the plate may have a smooth or slightly roughened surface.

To achieve a high luminous efficiency from the lighting device it is advantageous to arrange a condenser lens in the beam path in front of the Fresnel prism. A large portion of the light emerging from the light source is collected by the condenser lens and deflected onto the Fresnel prism, so that a higher portion of light impinges on the Fresnel prism.

The concentration of the light energy in a certain preferred direction by means of a location-dependent refractive angle distribution of the individual prism zones is limited in the upward direction since the deflection of the light impinging on the prism zones at a certain angle from the light source is possible within certain limits only. If a deflection is required, because a very large entry region is to be illuminated uniformly for example, then this may be achieved in that the condenser lens is arranged in decentralized manner in the lighting device, i.e. the optical center line of the condenser lens runs parallel off-center with respect to the optical center line of the lighting device. By means of the decentralized arrangement of the condenser lens the light beams impinge on the Fresnel prism with an asymmetrical angular distribution so that the concentration of the light energy in a preferred direction may be intensified. All optical elements such as the Fresnel prisms may be fabricated out of glass or out of an optical polymer such as polycarbonate, acrylic or allyl diglycol carbonate.

According to a preferred embodiment of the invention a diaphragm which interrupts the beam path in a region-wise manner is arranged in the beam path behind the Fresnel prism. As the pencil of rays emerging from the Fresnel prism consists of substantially parallel or divergent, not mixed, light rays, a certain region may be selectively shaded off by arrangement of a diaphragm. A sharp limiting of the pencil by a diaphragm is not possible in the case of mixed, i.e. crossing, rays. The resultant luminous intensity distribution may thus be adapted to the requirements for an optionally sharp outer boundary in simple and effective manner. This effect is particularly applicable in order to ensure a virtually completely dark vehicle door despite an optimal illumination of the ground region in front of the vehicle. As irritation to other motorists is ruled out by a darkening of the vehicle door, acceptance of a lighting device according to the invention by the corresponding approvals authorities is facilitated. Furthermore, the limitation of the illumination time, to 20 seconds for example, which is otherwise conventional in systems with clearly visible door reflexes, may be dispensed with.

To achieve a high luminous efficiency, a reflector, particularly a spherical reflector, should be incorporated in the lighting device. The reflector collects a part of the light rays which are not reflected by the light source in the direction of the housing opening and reflects them into the desired direction of radiation. An extensive parallelization of the reflected light may be achieved by the use of a spherical reflector.

A lighting device according to the invention may be constructed in per se arbitrary manner. It is advantageous when the light source is arranged in a tube, on the first axial end of which a reflector is arranged and at the opposite end of which the light generated may emerge, at least one Fresnel prism being arranged in the beam path. By this design the largest part of the generated light is radiated in the desired direction, all radiated light rays being deflected into the desired preferred direction by the Fresnel prism.

The main-purpose of the tube is to receive and spatially fix the individual components of the lighting device. Furthermore, the tube ensures the protection of the lighting device against external influences such as dirt, dust, water and the like. The optical properties of the generated light beam may be further improved if the light radiation emerging from the light source impinges neither on the reflector nor directly on the Fresnel prism and/nor on the condenser lens but is destroyed by absorption. By the absorption of this portion of light it is possible for extensively parallel or divergent, and not mixed, light to be radiated.

The desired light absorption by the tube surface may be achieved, for example, in that the tube is furnished with a matt black internal coating. By means of the matt black coating, however, the tube absorbs a large portion of the heat loss of the lighting device so that it heats up a great deal in undesired manner. It is therefore advantageous if the tube is made of a material such as plastic or glass which absorbs light waves in the visible wavelength range and is transparent to light waves in the infrared range, particularly in the wavelength range of heat radiation up to 4 $\mu$m. In the solution the visible light may be absorbed in a desired manner by this means, the heat radiation passing through the tube wall and being radiated to the side. A large part of the heat loss is thus radiated as heat radiation, so that in excessive heating of the tube is ruled out.

A possibility of producing a material with the desired absorption and/or transparency properties is to produce a plastic or glass, for example, from a transparent basic component which is provided with a dye, the dye absorbing visible light and being transparent to infrared radiation. The dye included in the transparent plastic acts as a wavelength-dependent filter. A per se arbitrary infrared-transparent plastic which has the desired properties as regards strength and heat resistance and can be provided with a corresponding dye may be used as basic component.

The "open signal" of the wireless remote control of a closure unit may be used in particular to control the lighting device according to the invention. This makes it possible to illuminate the entry region of the motor vehicle as soon as the passengers approach.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
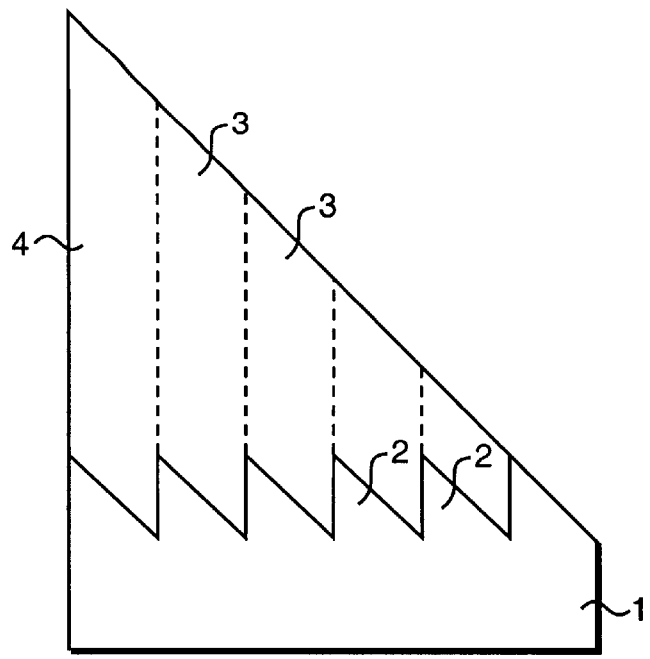
FIG. 1 shows a diagrammatic view of a prism body and a Fresnel prism derived therefrom in cross-section.

Referring to the drawings in particular, FIG. 1 shows a Fresnel prism 1 with a total of six light refraction zones 2, the light refraction zones corresponding to the prism zones 3 of a prism body 4 pushed together in stepwise manner. In the solution the light refraction zones 2 of the Fresnel prism 1 are designed as prism zones. According to the invention the properties of the Fresnel prism may be derived from prisms of any form in principle. The flanks of the light refraction zones may be flat or curved and the angle of refraction of the different light refraction zones may be different, which may be achieved by a different inclination of the flanks. In the regular Fresnel prism 1 all light refraction zones 2 have the same angle of refraction.

Figure 2:
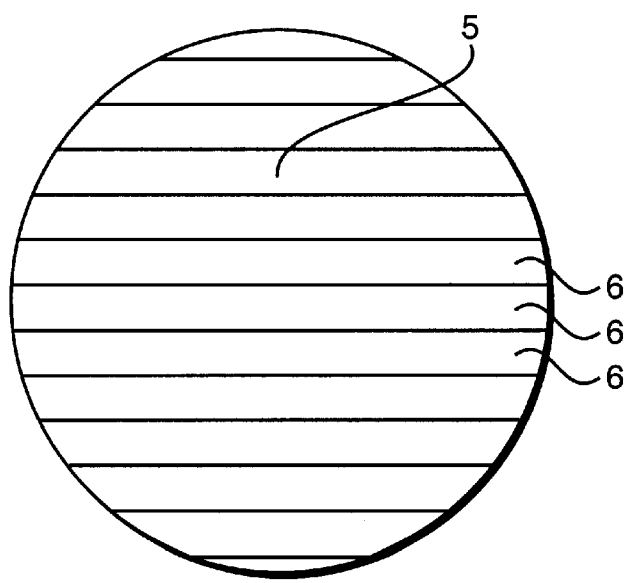
FIG. 2 shows a first embodiment of a Fresnel prism as viewed from above.

FIG. 2 shows an embodiment 5 of a Fresnel prism as viewed from above. The prism zones 6 run linearly parallel to each other so that this embodiment with a circular external contour may be stamped out of a continuous material. The prism zones 6 running parallel to each other permit the deflection of a light beam in a preferred direction which is orientated perpendicular to the course of the prism zones 6.

Figure 11:
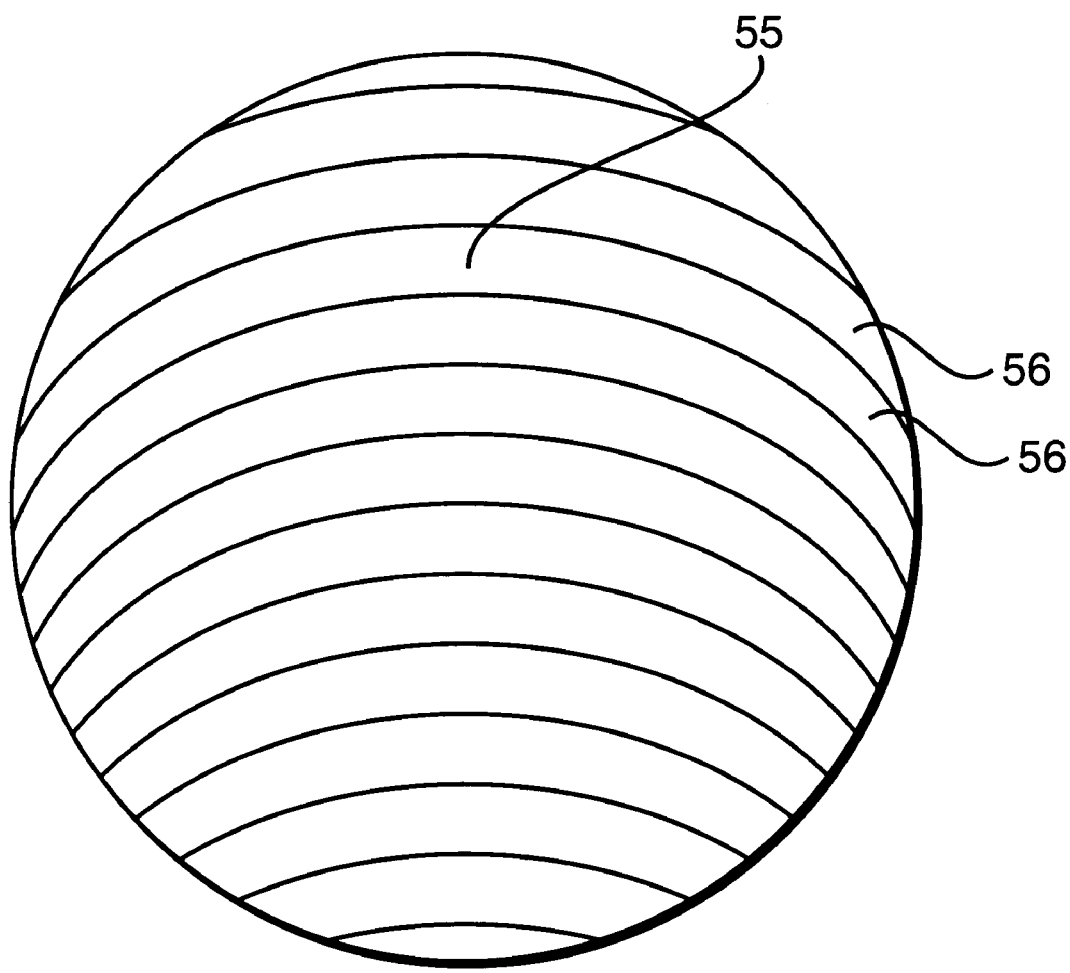
FIG. 11 shows a second embodiment of a Fresnel prism as viewed from above.

FIG. 11 shows an embodiment 55 of a Fresnel prism as viewed from above. The prism zones 56 run parallel to each other in centric arcs of a circle, so that this embodiment may be produced by cutting out of a normal centric Fresnel lens. The prism zones 56 running in curved manner with respect to each other permit the prismatic deflection of a light beam in a preferred direction and at the same time a collecting or scatter effect.

Figure 3:
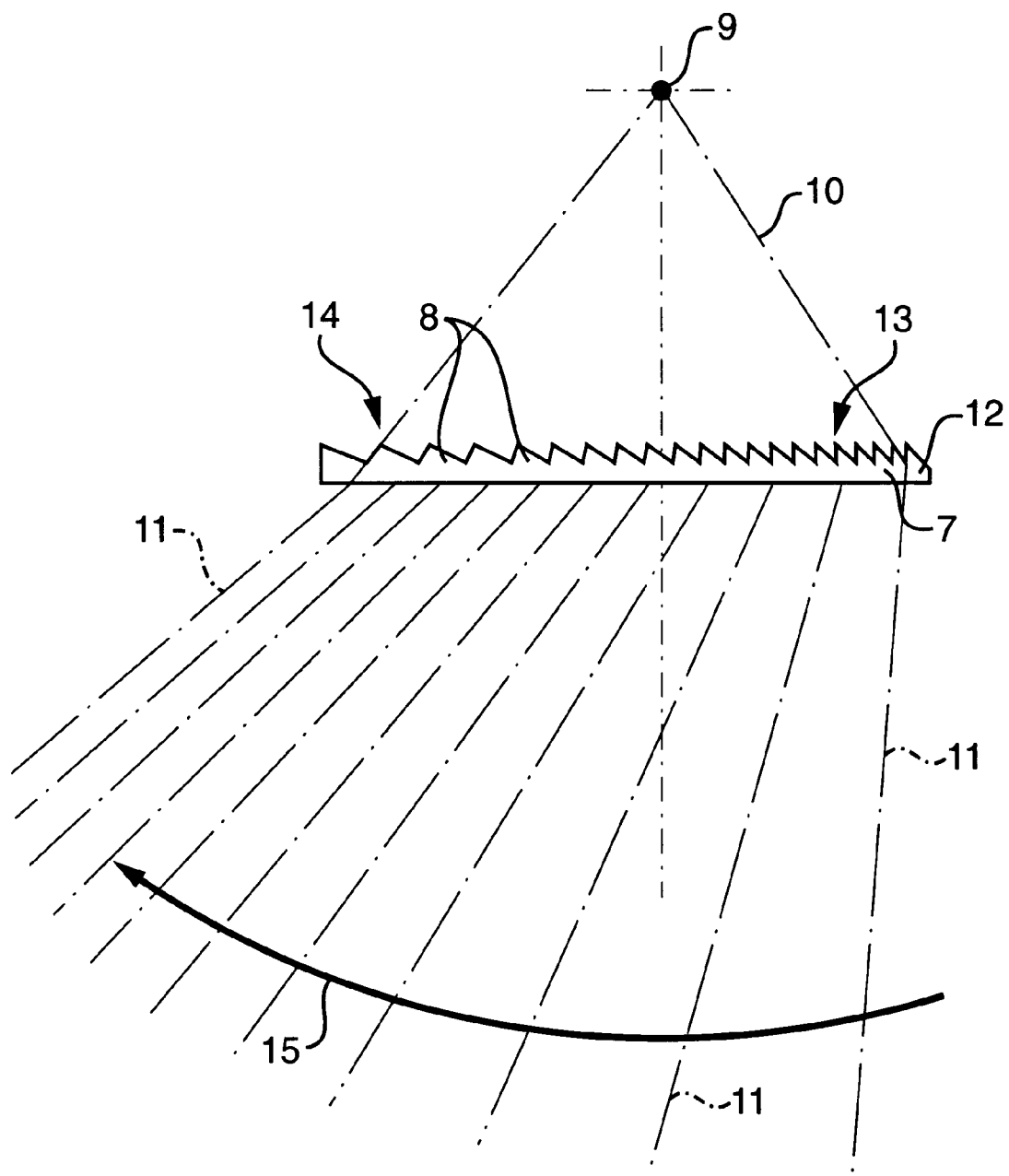
FIG. 3 shows a diagrammatic view of the refraction of light at a Fresnel prism.

The beam path shown in diagrammatic form in FIG. 3 shows the effect of the light refraction in a Fresnel prism 7, the light refraction zones 8 of which, which run linearly parallel to each other, have different angles of refraction. The light emerging from a light source 9 falls onto the Fresnel prism 7 in a cone of light 10 and is deflected there into the light rays 11 by light refraction in the individual prism zones 8. The angle of refraction of the different prism zones 8 is selected in such a way that the angle between two light rays emerging at adjacent prism zones decreases as the distance from the front prism zone 12 increases. By means of this location-dependent selection of the angle of refraction the light impinging in the front region 13 of the Fresnel prism 7 is more greatly scattered than in the rear region 14. This achieves an increase in the concentration of the light energy in the radiated light in the direction of the arrow 15. If the light rays 11 of relatively high light energy impinge on more distant surfaces and light rays 11 with relatively low light energy on near surfaces, in the solution there is a field of illumination with relatively uniform light intensity distribution since the higher light energy equalizes the intensity losses through the widening of the light cone at a greater distance.

Figure 4:
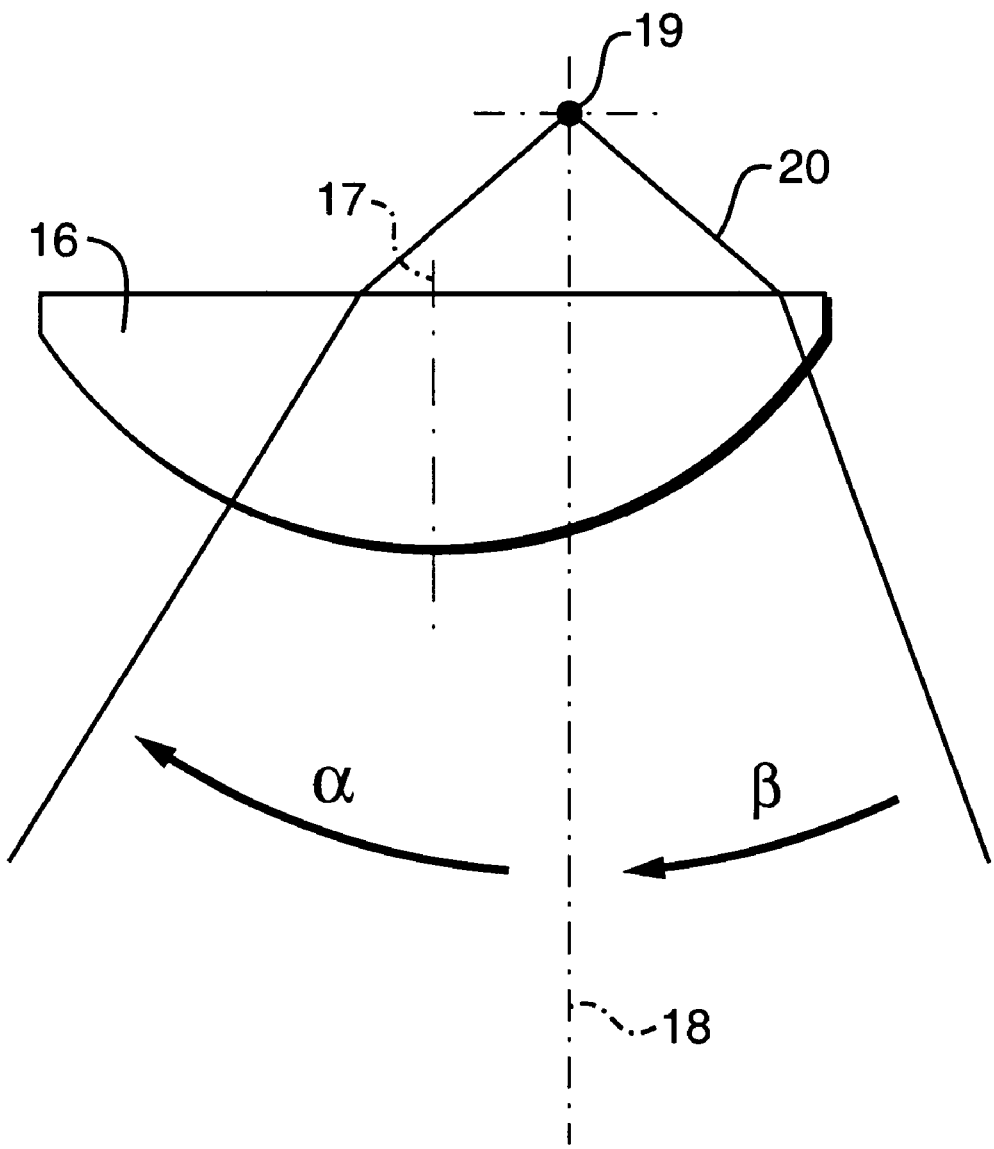
FIG. 4 shows a diagrammatic view of the refraction of light at a condenser lens arranged in decentralized manner.

FIG. 4 shows a condenser lens 16, the optical center line 17 of which runs parallel off-center with respect to the optical center line 18 of a lighting device of which only the light source 19 is shown. Because of the decentralized arrangement of the condenser lens, an asymmetrical deflection of type symmetrically incident pencil of light 20 takes place in addition to the collecting effect thereof. The angle of deflection $\alpha$ to the left of the center line 18 is greater than the angle of deflection $\beta$ to the right of the center line 18 because of the decentralized arrangement of the condenser lens.

Figure 5:
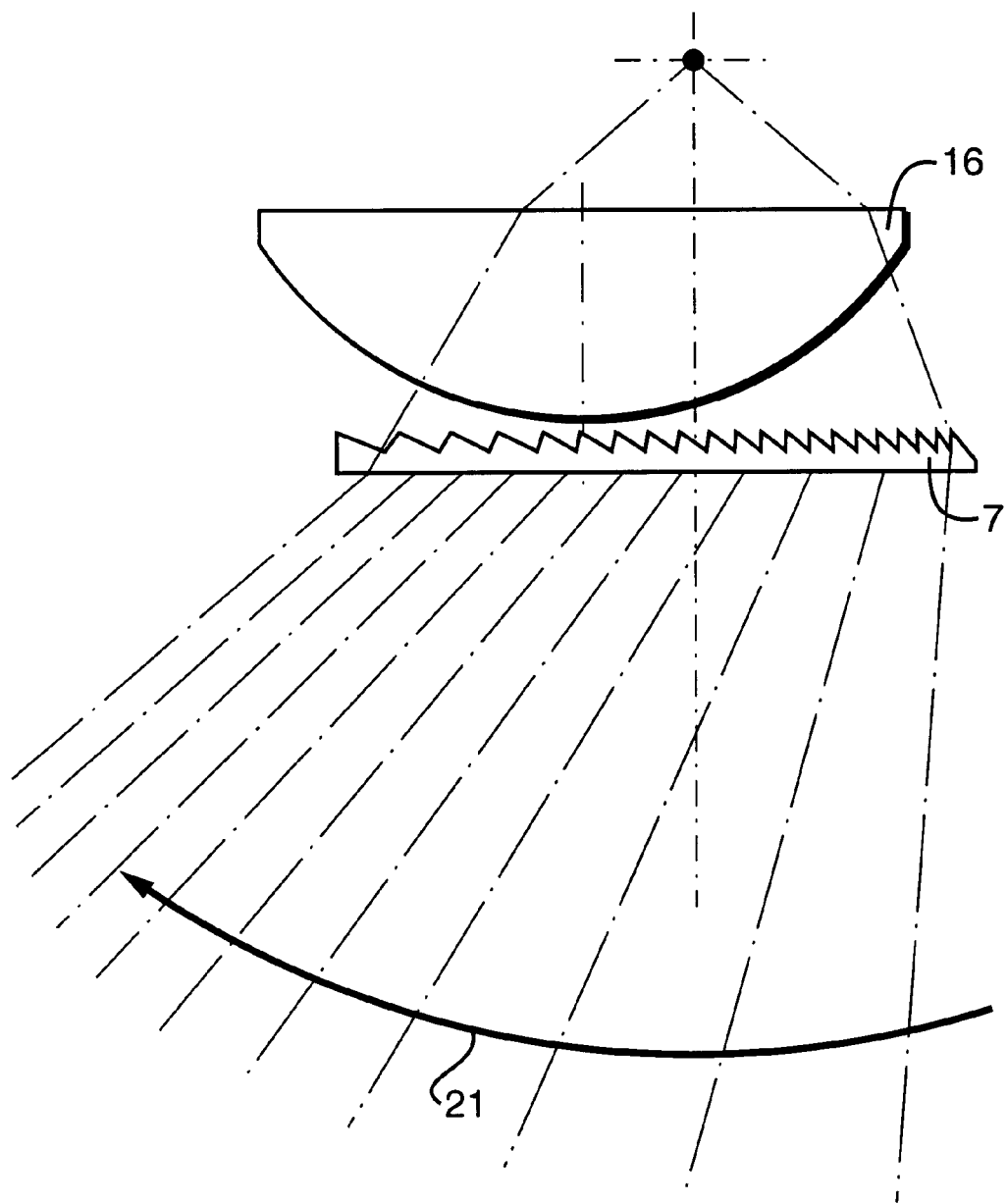
FIG. 5 shows a diagrammatic view of the refraction of light at an arrangement comprising a condenser lens arranged in a decentralized manner and a Fresnel prism.

FIG. 5 shows the light refraction by means of the combination of the condenser lens 16 with the Fresnel prism 7. The condenser lens 16 collects the light, so that it impinges on the Fresnet prism 7 corresponding to the size thereof. Furthermore, the concentration increase of the light energy in the emerging light rays is further intensified in the direction of the arrow 21 compared to refraction with no condenser lens because of the asymmetrical collecting effect of the condenser lens 16.

Figure 6:
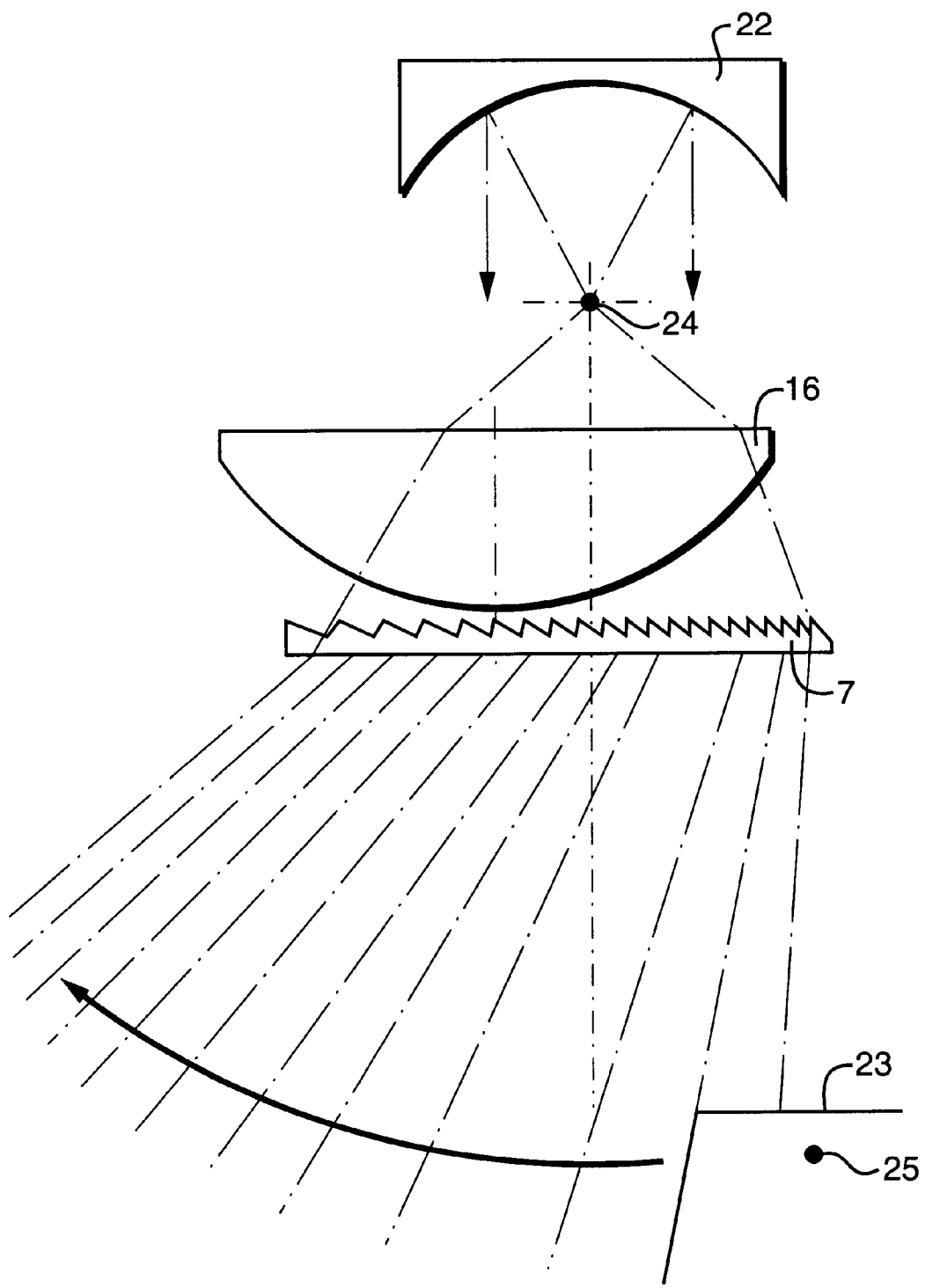
FIG. 6 shows a diagrammatic view of the refraction of light at an arrangement according to FIG. 5 with in additional spherical reflector.

FIG. 6 shows an arrangement according to FIG. 5 with an additional spherical reflector 22 and a diaphragm 23. By means of the spherical reflector 22 the light emerging in beam form from the light source 24 is partly parallelized so that the light incident into the condenser lens 16 contains a relatively high proportion of parallel light. Since the radiated pencil of rays substantially contains only parallel or diverging, but scarcely any mixed light rays, a sharply bounded shading, in the region of a vehicle door for example, may be achieved by means of the diaphragm 23. The region 25 under the diaphragm 23 remains substantially dark as no light rays are radiated in that direction.

Figure 7:
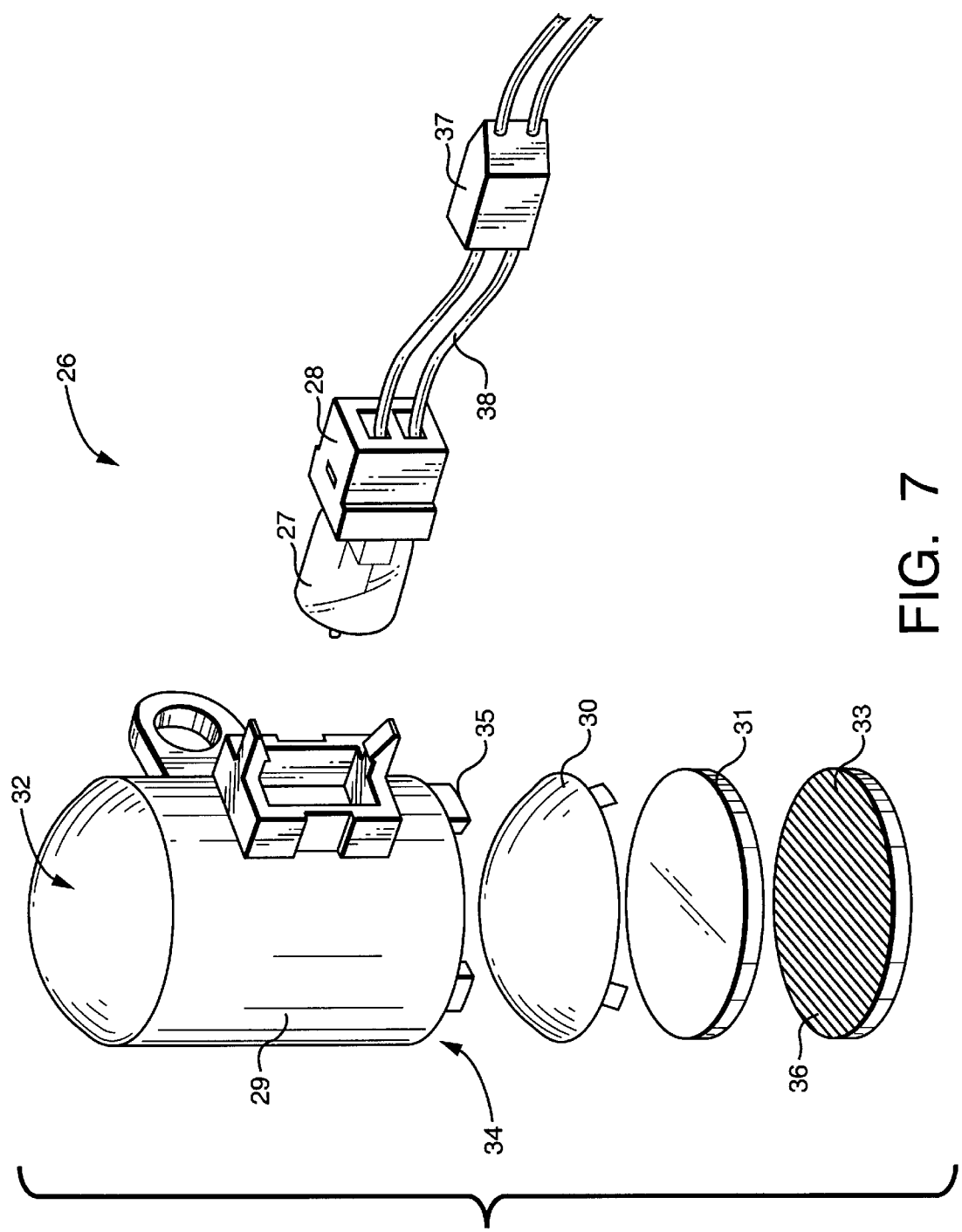
FIG. 7 shows a lighting device according to the invention in a diagrammatic exploded view.

FIG. 7 shows an exploded view of the construction of an embodiment 26 of a lighting device according to the invention. The light source 27 in the form of a halogen lamp is inserted into a lampholder 28 which can be fixed in the tube 29 open on one side by means of a clip connection. The mirror-finish spherical reflector 30 is pushed into the tube 29 from below, until it comes to rest on the latter's upper end 32 of complementary shape and latches therein. The condenser lens 31 and the Fresnel prism 33 arc latched into the latching claws 35 at the lower end 34 of the tube 29 and close the tube 29 in the downwards direction. The prism structure 36 on the upper side of the Fresnel prism 33 points towards the inside of the tube 29, so that the sensitive flanks of the prism zones are protected. The lampholder 28 is sealed with the staling bellows 37 which contains recesses for the power cables 38.

Figure 8:
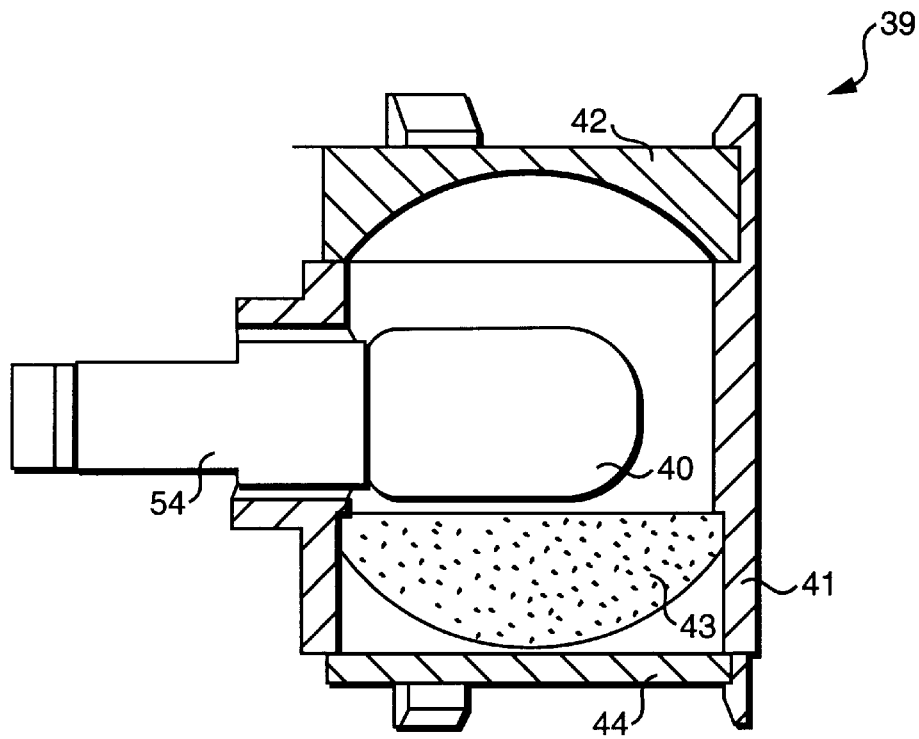
FIG. 8 shows a lighting device according to the invention in longitudinal section according to the line of intersection I—I of FIG. 9.
Figure 9:
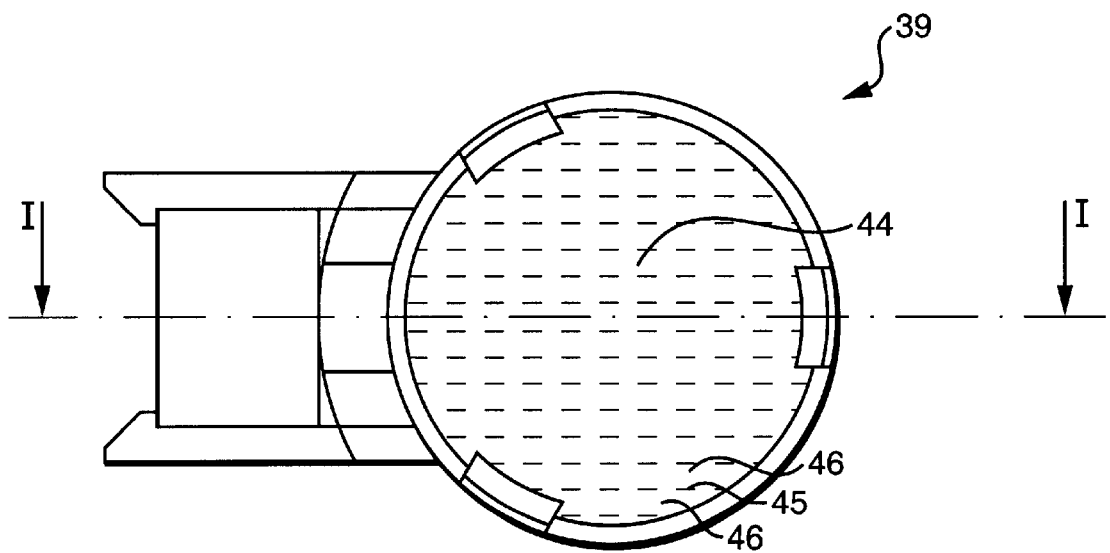
FIG. 9 shows the lighting device according to FIG. 8 as viewed from below.

FIG. 8 shows an embodiment 39 of a lighting device according to the invention along intersection I—I of FIG. 9. A light source 40 which is inserted into a lampholder 54, a tube 41, a spherical reflector 42, a condenser lens 43 and a Fresnel prism 44 can be seen. This produces a compact lighting device which may be simply integrated into the housing of an external rear view mirror.

FIG. 9 shows the embodiment 39 as viewed from below. The inner surface structure on the upper side of the Fresnel prism 44 is indicated by the linear dashed lines 45 between the individual prism zones 46.

Figure 10:
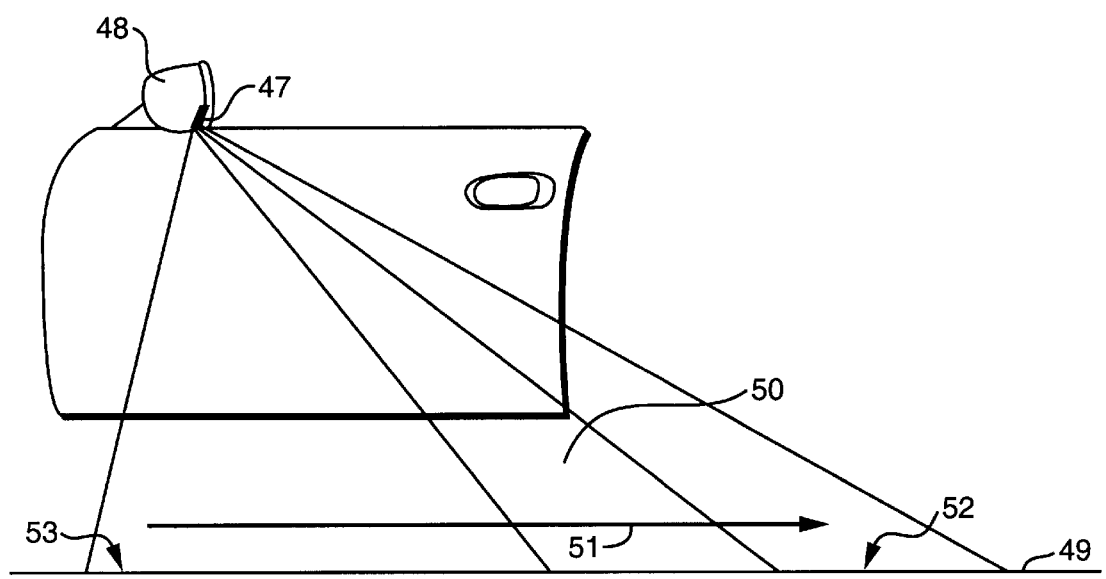
FIG. 10 shows the luminous intensity distribution in the light beam of a lighting device according to the invention arranged in an external rear view mirror.

FIG. 10 illustrates the possibility of influencing the light intensity in a field of illumination by the use of a lighting device according to the invention. A lighting device 47 shown in concealed form is incorporated in the interior of an external rear view mirror 48. Because of the installation situation of the lamp in the base region of the external rear view mirror 48 the light emergence surface is substantially parallel to the road surface 49. The light intensity resulting on the road, i.e. the luminous intensity, decreases with the distance from the lighting, device and with the cosine of the angle of incidence. In order to achieve as uniform as possible a light intensity distribution on the road surface 49 in the region of the entry point into the car as far as the rear wheel which is not shown, the light energy in the emerging pencil of rays 50 must be concentrated in the direction of the arrow 51, i.e. in the direction of the rear of the vehicle which is not shown. The concentration of the light energy which increases in the direction of the arrow 51 is indicated diagrammatically by the increasingly dark shading to illustrate the pencil of rays 50. In the solution there is a uniform light intensity distribution on the road surface 49 in the entry region, so that the luminous intensity in the region 52 in the rear-most part of the entry region is only unsubstantially weaker than the luminous intensity in the region 53, directly below the lighting device 47.

While specific embodiments of the invention have been shown and described in detail to illustrate the application of the principles of the invention, it will be understood that the invention may be embodied otherwise without departing from such principles.

What is claimed is:

1. A lighting device for arrangement on the external or internal rear view mirror of a motor vehicle, the lighting device comprising:

a light source generated by said lighting device;

a transparent light refraction element;

a mirror housing with an opening, the light rays of said light source emerging at said mirror housing opening and are deflected at said transparent light refraction element arranged in the beam path;

a Fresnel prism plate-like light refraction element having a surface structure on one side dividing said Fresnel prism plate-like light refraction element into several lighty refraction zones, the light refraction zones corresponding to prism zones of a prism body which are pushed together in stepwise manner; and a condenser lens arranged in the beam path in front of the Fresnel prism.

2. The lighting device according to claim 1, wherein said prism zones are arranged in the Fresnel prism in a manner running linearly parallel to each other.

3. The lighting device according to claim 1, wherein said prism zones run substantially perpendicular to the longitudinal axis of the vehicle and the light is refracted in the direction of the rear of the vehicle.

4. The lighting device according to claim 2, wherein said prism zones run substantially perpendicular to the longitudinal axis of the vehicle and the light is refracted in the direction of the rear of the vehicle.

5. The lighting device according to claim 1, wherein at least two of said prism zones have a different angle of refraction with respect to a common reference axis normal to the plate-like light refraction element.

6. The lighting device according to claim 2, wherein at least two of said prism zones have a different angle of refraction with respect to a common reference axis normal to the plate-like light refraction element.

7. The lighting device according to claim 3, wherein at least two of said prism zones have a different angle of refraction with respect to a common reference axis normal to the plate-like light refraction element.

8. The lighting device according to claim 5, wherein said angle of refraction of individual said prism zones is selected in such a way that the angle between two light beams emerging at adjacent prism zones decreases as the distance from the front prism zone increases.

9. The lighting device according to claims 1, wherein said prism surface structure of the Fresnel prism is arranged in the lighting device pointing towards the interior of said mirror housing.

10. The lighting device according to claim 1, wherein an optical center line of said condenser lens runs parallel off center with respect to an optical center line of the lighting device.

11. The lighting device according to claims 1, further comprising a diaphragm, which interrupts the beam path in a region wise manner, arranged in the beam path behind the Fresnel prism.

12. The lighting device according to claims 1, further comprising a reflector arranged in the lighting device.

13. The lighting device according to claims 12, wherein said reflector is a spherical reflector.

14. The lighting device according to claims 1, wherein said light source is arranged in a light absorbing tube at a first axial end of which a reflector is arranged and at the opposite end of which the generated light beam may emerge, at least one Fresnel prism being arranged in the beam path.

15. The lighting device according to claims 14, further comprising a condenser lens arranged in the beam path and said reflector wherein said tube absorbs light rays from said light source which do not impinge directly on the Fresnel prism, the condenser lens and the reflector.

16. The lighting device according to claim 14, wherein said tube is made of a material which absorbs light waves in the visible wavelength range and is transparent to light waves in the infrared range, particularly in the wavelength range of heat radiation up to 4 µm.

17. The lighting device according to claim 16, wherein said material for producing the tube consists of an infrared-transparent basic component which is provided with a dye, the dye absorbing visible light and being transparent to infrared radiation.

18. The lighting device according to claim 6, wherein said angle of refraction of individual said prism zones is selected in such a way that the angle between two light beams emerging at adjacent prism zones decreases as the distance from the front prism zone increases.

19. The lighting device according to claim 7, wherein said angle of refraction of individual said prism zones is selected in such a way that the angle between two light beams emerging at adjacent prism zones decreases as the distance from the front zone increases.

20. A lighting device for arrangement on the external or internal rear view mirror of a motor vehicle, the lighting device comprising:

a light source, wherein said light source is arranged in a tube at a first axial end;

a transparent light refraction element;

a mirror housing with an opening, the light rays of said light source emerging at said mirror housing opening and are deflected at said transparent light refraction element arranged in the beam path;

a Fresnel prism plate-like light refraction element having a surface structure on one side dividing said Fresnel prism plate-like light refraction element into several light reaction zones, the light refraction zones corrersponding to prism zones of a prism body which are pushed together in stepwise manner;

a condenser lens arranged in the beam path in front of the Fresnel prism, wherein an optical center line of said condenser lens runs parallel off center with respect to an optical center line of the lighting device;

a diaphragm, which interrupts the beam path in a region-wise manner, arranged in the beam path behind the Fresnel prism; and a reflector wherein said tube absorbs light rays which do not impinge directly on the Fresnel prism, the condenser lens or the reflector, wherein said tube absorbs light rays which do not impinge directly on the Fresnel prism, the condenser lens or the reflector, said material for producing the tube consists of an infrared-transparent basic component which is provided with a dye, the dye absorbing visible light and being transparent to infrared radiation.

21. A lighting device for arrangement on the external or internal rear view mirror of a motor vehicle, the lighting device comprising:

a light source, wherein said light source is arranged in a tube at a first axial end of which a reflector is arranged and at the opposite end of which the generated light beam may emerge;

a transparent light refraction element;

a mirror housing with an opening, the light rays of said light source emerging at said mirror housing opening and are deflected at said transparent light refraction element arranged in the beam path;

a Fresnel prism plate-like light refraction element having a surface structure on one side dividing said Fresnel prism plate-like light refraction element into several light refraction zones, the light refraction zones corresponding to prism zones of a prism body which are pushed together in stepwise manner; and a condenser lens arranged in the beam path in front of the Fresnel prism, wherein an optical center line of said condenser lens runs parallel off center with respect to an optical center line of the lighting device; and a diaphragm, which interrupts the beam path in a region-wise manner, arranged in the beam path behind the Fresnel prism.

* * * * *